(12) United States Patent
Metz

(10) Patent No.: US 11,957,535 B1
(45) Date of Patent: Apr. 16, 2024

(54) PREPARATION TRAY FOR IMPROVED ETCHING AND BONDING OF A TOOTH SURFACE PRIOR TO THE PLACEMENT OF A TOOTH ATTACHMENT OR A BRACKET

(71) Applicant: Carl J. Metz, Scottsdale, AZ (US)

(72) Inventor: Carl J. Metz, Scottsdale, AZ (US)

( * ) Notice: Subject to any disclaimer, the term of this patent is extended or adjusted under 35 U.S.C. 154(b) by 0 days.

(21) Appl. No.: 17/963,111

(22) Filed: Oct. 10, 2022

(51) Int. Cl.
*A61C 7/14* (2006.01)

(52) U.S. Cl.
CPC .................. *A61C 7/146* (2013.01)

(58) Field of Classification Search
CPC .................. A61C 7/146; A61C 7/08
See application file for complete search history.

(56) References Cited

U.S. PATENT DOCUMENTS

| | | | |
|---|---|---|---|
| 5,975,893 A * | 11/1999 | Chishti | A61C 9/00 |
| 6,217,325 B1 | 4/2001 | Chishti et al. | |
| 6,309,215 B1 * | 10/2001 | Phan | A61C 9/00 |
| | | | 433/24 |
| 6,607,382 B1 * | 8/2003 | Kuo | A61P 1/02 |
| | | | 433/80 |
| 7,252,509 B2 * | 8/2007 | Sachdeva | A61C 7/146 |
| | | | 433/229 |
| 8,303,302 B2 * | 11/2012 | Teasdale | A61C 7/08 |
| | | | 433/37 |
| 8,684,729 B2 | 4/2014 | Wen | |
| 9,345,557 B2 | 5/2016 | Anderson et al. | |
| 10,045,835 B2 * | 8/2018 | Boronkay | A61C 7/14 |
| 10,179,035 B2 | 1/2019 | Shivapuja et al. | |
| 10,335,253 B2 | 7/2019 | Martz et al. | |
| 10,383,706 B2 * | 8/2019 | Portalupi | A61C 7/146 |
| 10,548,700 B2 * | 2/2020 | Fernie | A61C 7/002 |
| 10,631,960 B2 | 4/2020 | DiMarino | |
| 10,952,821 B2 | 3/2021 | Falkel | |
| 11,382,730 B2 * | 7/2022 | Fernie | A61C 7/002 |
| 2004/0166463 A1 * | 8/2004 | Wen | A61C 7/146 |
| | | | 433/24 |
| 2005/0233276 A1 * | 10/2005 | Kopelman | A61C 7/08 |
| | | | 433/3 |
| 2007/0026358 A1 | 2/2007 | Schultz | |
| 2007/0287121 A1 * | 12/2007 | Cinader | A61C 7/146 |
| | | | 433/24 |
| 2009/0280450 A1 * | 11/2009 | Kuo | A61C 7/08 |
| | | | 433/9 |
| 2013/0029285 A1 * | 1/2013 | Teasdale | A61C 7/08 |
| | | | 433/6 |

(Continued)

*Primary Examiner* — Ralph A Lewis
(74) *Attorney, Agent, or Firm* — Mark V. Loen

(57) ABSTRACT

An improved preparation method uses an additional preparation tray as part of a multi-step tray alignment system which achieves orthodontic tooth movement. The preparation tray incorporates openings in the tray for the application of a bonding preparation fluid, such as an etching agent, or alternately, an etching and bonding agent, in the correct location and amount. The openings are at least the size and shape of the tooth attachments and greatly reduce the tooth surface area accessible to the clinician. This confines the bonding preparation fluid to an area equal to, or slightly larger than, the attachment contact area. The method and apparatus provide faster application, vastly reduced cleanup, less tooth enamel damage, and less chair time for the patient.

8 Claims, 12 Drawing Sheets
(2 of 12 Drawing Sheet(s) Filed in Color)

(56) References Cited

U.S. PATENT DOCUMENTS

| | | |
|---|---|---|
| 2013/0230819 A1 | 9/2013 | Arruda |
| 2016/0220329 A1* | 8/2016 | Miller |
| 2017/0165032 A1* | 6/2017 | Webber .................... A61C 7/08 |
| 2017/0319296 A1* | 11/2017 | Webber .................. B33Y 80/00 |
| 2019/0159871 A1 | 5/2019 | Chan et al. |
| 2019/0298494 A1* | 10/2019 | Webber .................. A61C 7/145 |
| 2020/0060797 A1 | 2/2020 | Sachdeva et al. |

* cited by examiner

PREPARATION TRAY FOR IMPROVED ETCHING AND BONDING OF A TOOTH SURFACE PRIOR TO THE PLACEMENT OF A TOOTH ATTACHMENT OR A BRACKET

RELATED APPLICATIONS

Not applicable

STATEMENT OF GOVERNMENT INTEREST

Not applicable.

FIELD AND BACKGROUND OF THE INVENTION (1) Field of the Invention

This invention is directed to improvements in the orthodontic alignment of teeth. In particular, the preparation for the multi-step plastic aligner tray is improved by adding an additional tray when applying an etch or a bonding adhesive to the surface of a tooth.

(2) Description of Related Art

Cosmetic alignment of teeth is very common throughout the world. The desire for straight teeth, or a particular aesthetic, is known to date back to ancient times.

A recent advance is the use of clear aligner systems. This method utilizes removable thermoplastic aligner trays in a multi-step process. In this method there are improved oral hygiene benefits and fewer patient issues when compared to metal or ceramic bands and bracket systems.

Tooth positioning trays can be fabricated using a variety of methods. Exemplary methods for fabricating sequential aligner trays can be found in numerous patents and patent applications that are assigned to Align Technology, Inc and others.

The multiple aligner tray approach has important benefits. The trays provide orthodontic tooth movement based on a designed progression of steps. Placing the aligner over the teeth provides straightening forces that are designed to move and rotate teeth. By putting successive aligning trays over teeth, forces are gradually applied to malpositioned teeth. The teeth respond by gradually moving and rotating. The trays are typically worn at least 20 hours per day and can be conveniently removed to eat, brush, and floss. A typical number of successive trays might be 20-30, and more if needed.

Initially, plastic aligner trays had limitations for how teeth could be orthodontically moved. A series of progressive aligners had limited control over the amount of tooth movement. Over the years, this has been improved by incorporating tooth attachments that are bonded to a tooth by an adhesive. Successive aligner trays incorporate the tooth attachments and are additionally used to achieve better control and larger tooth movements.

The tooth attachments must be created and bonded to the teeth of each patient and are individually designed. The bonding process requires that the tooth is prepared by etching and by placing a bonding agent, which is a more general term for dental adhesive. The bonding agent may be a dental adhesive, a dental primer and adhesive, or a self-etching adhesive. Unfortunately, the method of applying the etching and bonding agents is difficult to control.

Typically, the clinician manually places the etching agent on the tooth surface and the amount and location is difficult to control. If too much is applied, it must be cleaned up. Excessive etching damages the tooth surface. If the tooth receives enough damage, the clinician must repair the unnecessary damage.

An additional complicating factor is the creation of the tooth attachments. A wide variety of 3D geometries can be used for the attachment and are specific to the desired tooth movement. This flexibility allows the aligner tray to apply suitable rotational and positioning forces on the tooth.

To make an attachment, the clinician uses a special attachment creation tray. The tray fits the teeth in their initial state and includes small chambers in the shape and location of the desired attachments. The attachments are then made by placing a dental compound into the chambers, which project outwardly from the tooth on the attachment creation tray. The tray is then seated on the teeth. The dental compound is then light cured in place to simultaneously create a solid tooth attachment and a strong bond to the tooth.

The typical clinician steps for adding tooth attachments to a tooth are:

1. Confirm a good fit of the attachment creation tray by placing it onto the patient's teeth and examining it for a correct fit.
2. Remove plaque from teeth by polishing using standard dental tools.
3. Rinse and air dry teeth.
4. Add a retraction (mouth opening) device to prevent cheeks from touching teeth. Air dry teeth again.
5. Apply an etch agent to the entire surface of the tooth, and let it stand for 30 seconds. Rinse with water and suction out.
6. Air dry teeth again.
7. Apply a bonding agent to the etched tooth surface, then air thin the bonding agent.
8. Load the attachment creation tray with dental compound into the attachment tray chambers with a spatula.
9. Place attachment creation tray firmly onto teeth, and verify tray is correctly and fully seated.
10. Cure each attachment with blue light—a 10 second cure with light is typical. This bonds the attachment to the tooth and cures the dental compound for a solid attachment.
11. Remove the attachment creation tray. The tooth attachments should now be well anchored in place.
12. Clean up flash around the attachments. Floss teeth to be sure there is no flash between the teeth.

The specialized attachment creation tray is normally a 3D print from a specialized tooth correction model, where the shape and the size of the bonded attachments are designed by a computer program, and a technician's expertise.

Alternately, the attachments can be pre-made of any suitable material including dental composite, clear or tooth-colored ceramic materials, or any suitable clear plastic material. In this case, an attachment tray is used to hold the attachments, and they are similarly bonded to the teeth with an etch, and bonding agent.

Alternately, brackets (a premade attachment) can be applied to a tooth with similar bonding methods of tooth preparation and the application of a bonding agent. Brackets are useful for other methods of correcting teeth position when used with wires.

Clinicians have concerns with the attachments as the manual process to create them is very imprecise:

1. Patients would prefer to be without attachments and dentists would prefer to avoid the steps that make them. However, to get a tooth to move there must be a feasible way for applying a correctly oriented force to a tooth. The attachments are subject to a wide variety of stresses, which include brushing, flossing, the placing and removal of sequential alignment trays, heat, cold, and eating.
2. Most attachment shapes cannot be accurately replaced in the middle of treatment. It is difficult to replace shapes that can be, especially in the middle of treatment. To that end, the best possible methods are desirable to establish a failure free experience.
3. An attachment needs a tooth surface that is etched and bonded for best adhesion. Unfortunately, the application of an etching agent and a bonding agent is manually positioned, and the clinician must 'eye-ball' the location and needed surface area coverage. Typical instructions from a manufacturer are to apply etching and bonding agent to the entire front tooth surface, but the resulting tooth damage from excessive etching is highly undesirable. Some clinicians use a thick etching mixture and apply it with a needle nose syringe to reduce the etched area. This is still an imprecise method of avoiding tooth damage.
4. The chambers in the attachment creation tray must be filled manually by the clinician and is readily seen as an imprecise method. The dental compound has a thickened, paste like structure, and the exact amount needed to create the attachment geometry is difficult to estimate. If too little is used, the attachment will break free from the tooth or be malformed. If too much is used, the compound will squeeze out from the attachment chamber and flow between the tooth and the tray. This will cause the compound to spread onto the tooth in a larger area than needed, creating dental compound flash. Excess flash bonds to any etched/bonded area around the designed tooth attachment. The bonded flash is firmly affixed to the tooth and becomes difficult to remove. In this case, it must be ground off.
5. Patients complain if the attachment has a large amount of flash and covers too much of the tooth, or if their teeth become damaged.

At the end of the treatment, when the teeth are straightened, the attachments are usually removed by grinding away layer by layer, based on a visual assessment by the clinician.

The deficiencies and drawbacks experienced by the prior art methods needs to be improved so that tooth surface damage is minimized. It is highly desirable that an improved means for creating attachments is developed that overcomes the deficiencies of current art methods in a practical and effective way.

It is therefore an object of the present invention to address the foregoing problems by creating a more precise means for creating a tooth attachment on a tooth.

SUMMARY OF THE INVENTION

An improved preparation method uses an additional preparation tray as part of a multi-step alignment tray system which achieves orthodontic tooth movement. The preparation tray incorporates openings in the tray for the application of a bonding preparation fluid, such as an etching agent, or alternately, an etching and bonding agent, in the correct location and amount. The openings are at least the size and shape of the tooth attachments and greatly reduce the area of tooth surface accessible to the clinician. This confines the bonding preparation fluid(s) to an area equal to, or slightly larger than, the attachment contact area. The method and apparatus provide faster application, vastly reduced cleanup, less tooth enamel damage, and less chair time for the patient.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
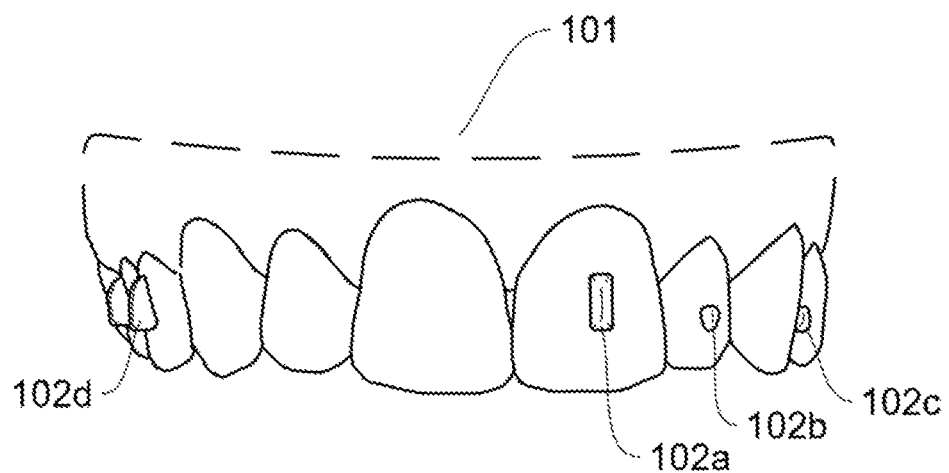
FIG. 1 shows various size and shape tooth attachments that are bonded to a tooth surface when straightening teeth in a multi-step alignment tray process.

In order to make the needed improvements, a new tooth preparation tray is needed. In FIG. 1, an upper row of teeth 101 have received tooth attachments in preparation for a sequence of aligner trays. The tooth attachments have various shapes. One shape is a rectangle 102a, another is a smoothed triangle 102b, another is irregular 102c, and others might be a triangle base that projects outwardly to include a central ridge 102d. A variety of similar small 3D shapes are equally used.

Figure 2:
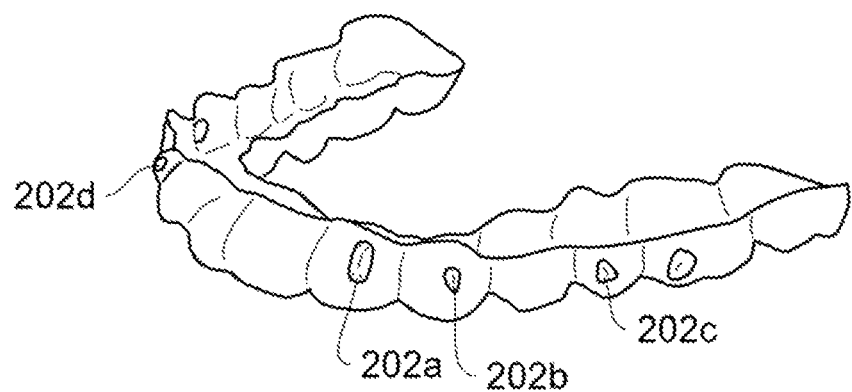
FIG. 2 shows an attachment creation tray with protruding chambers for tooth attachments.

The shapes are created from an attachment creation tray chamber as shown in FIG. 2. For example, attachment chamber 202d will create attachment 102d. Similarly, 202a, b, c create attachments 102a, b, c respectively.

Figure 3A:
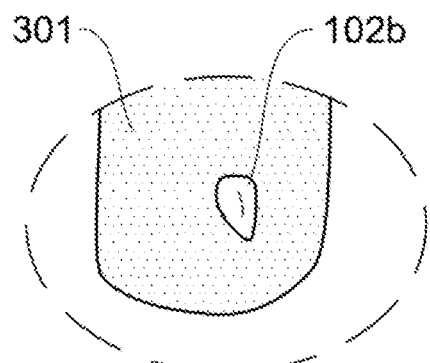
FIGS. 3A-3H discusses issues with current art method of tooth attachments.
Figure 3B:
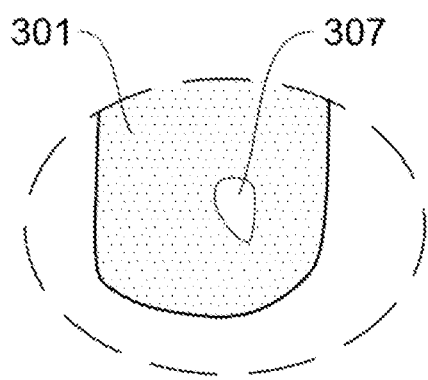
Figure 3C:
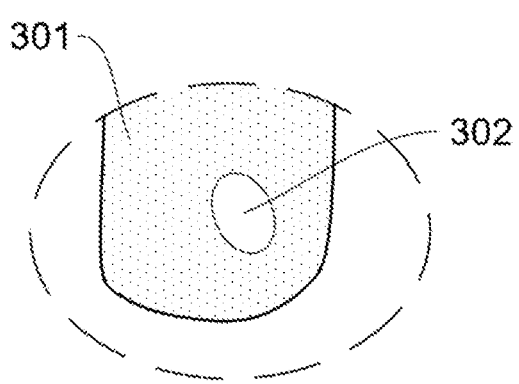

In current art methods of creating the tooth attachments, the attachment 102b on tooth surface 301 in FIG. 3A is highlighted. To create the tooth attachment, FIG. 3B shows the contact area 307 of the attachment 102B which is the minimum amount of tooth area that needs preparation. FIG. 3C highlights an alternate amount of surface area 302 which could be used to etch and bond for mounting the tooth attachment 102b.

Figure 3D:
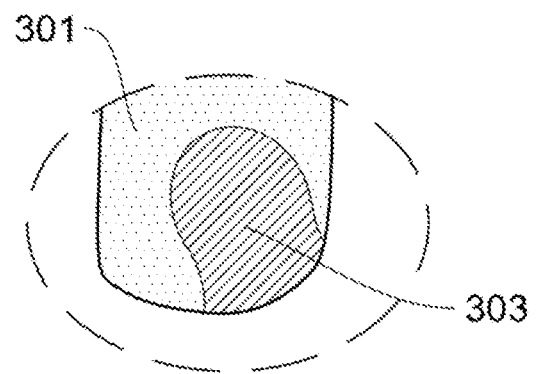

However, in current art practice, as illustrated in FIG. 3D, the manual ability to etch and bond the small area 302 in FIG. 3C is generally not practical, and the tooth preparation area 303 will be larger.

In contrast, the embodied invention utilizes an improved preparation method having an additional preparation tray to address this issue. This will be discussed in FIGS. 4A-4F.

Figure 3E:
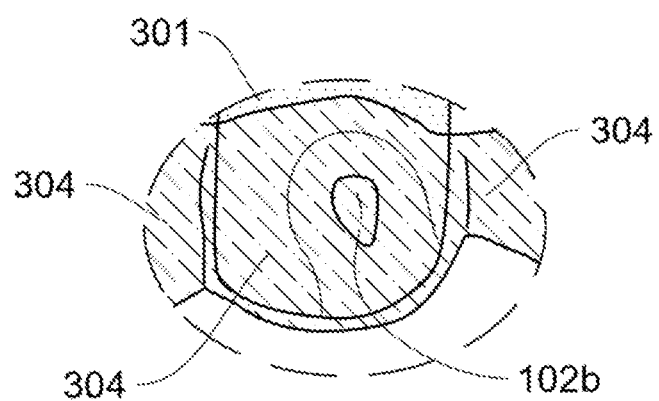

In the current art of FIG. 3E, the attachment creation tray 304 is inserted onto the tooth, and the tooth attachment 102b is created and bonded to the tooth by a curing light. See FIG. 3H for additional details on this step.

Figure 3F:
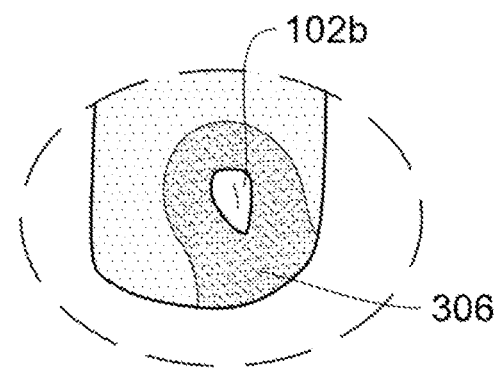
Figure 3G:
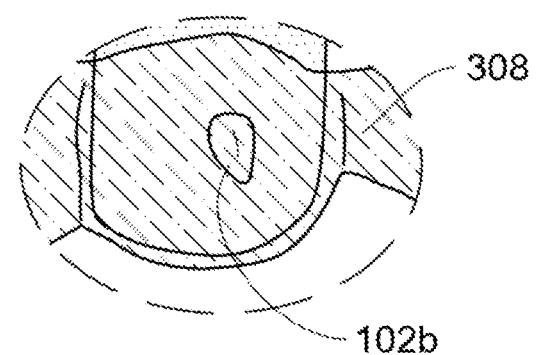

In FIG. 3F, the tooth attachment 102b is now bonded to the tooth. Unfortunately, the actual etching and bonding area 306 highlights the excessive amount of likely bonded dental compound flash typically seen in current art practice. To finish, FIG. 3G shows the tooth attachment 102b now inside the first aligning tray 308 which begins to place corrective forces on the tooth.

Figure 3H:
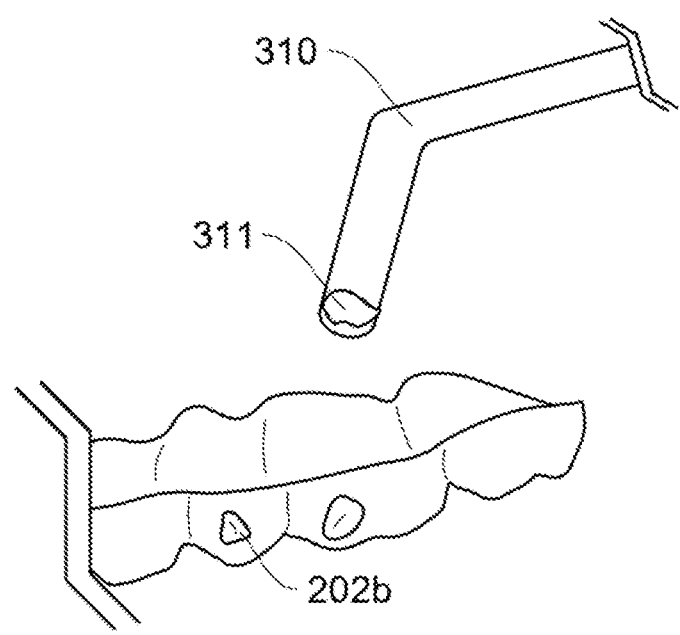

FIG. 3H shows a view of the dental spatula 310 that is used to manually apply dental compound 311 into the attachment chamber 202b. All the chambers in the special attachment creation tray must be filled manually by the clinician based on a visual judgement. Clinicians err on the side of an excessive amount to be sure the attachment is complete. Unfortunately, this is also an imprecise method, which leads to excessive bonded flash in current art methods.

Figure 4A:
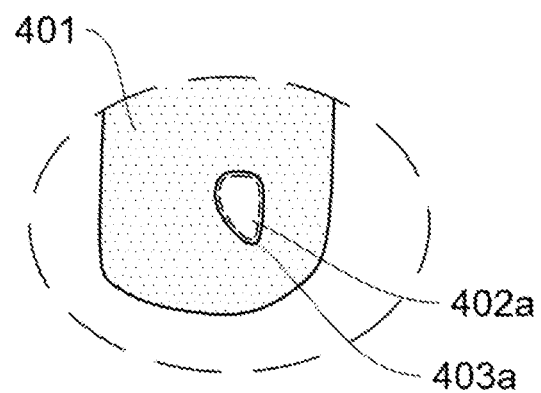
FIGS. 4A-4F discusses the embodied invention that provides a new method to adhere tooth attachments used in straightening teeth.

FIG. 4A shows a tooth with a tooth attachment contact area 402a and the practical increased area 403a for the tooth preparation area for the etched surface. However, the tooth preparation area is preferably the same size and shape of the tooth attachment contact area, within the tolerances of the attachment tray geometry and the creation of the holes. As a practical matter, it may be slightly larger in some cases where the tooth attachment geometry is complex.

Figure 4B:
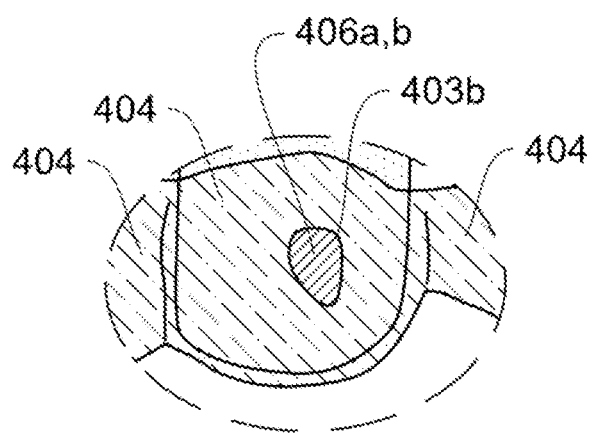

FIG. 4B shows a special preparation tray 404 that includes an opening 403b or hole in the tray, that matches the outline of the desired preparation area 403a. The opening then allows the etching 406a to be applied and confines it to the preparation area. After rinsing, the tray is removed for the manual application of a bonding agent 406b to the preparation area, and it is dried in place. Alternately, the preparation tray 404 remains in place for the application of the bonding agent. This continues for all needed teeth in the preparation tray. In cases where a tooth must be sandblasted for bonding strength, such as a crown, the preparation tray can remain in place and limit the surface area that is sandblasted, to only the tooth preparation area.

Figure 4C:
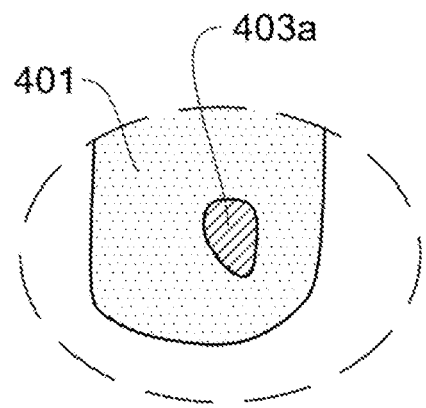
Figure 4D:
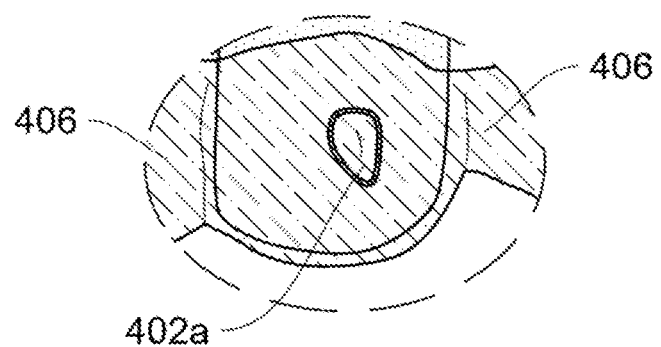

FIG. 4C shows a tooth 401 with a preparation area 403a that is ready for the next step where the attachment creation tray 406 is placed on the tooth as shown in FIG. 4D. The tooth attachment 402a is shown after the dental compound has been placed into the tray and cured, which bonds the attachment to the tooth surface.

Figure 4E:
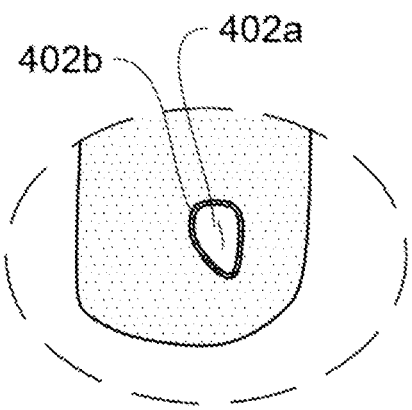
Figure 4F:
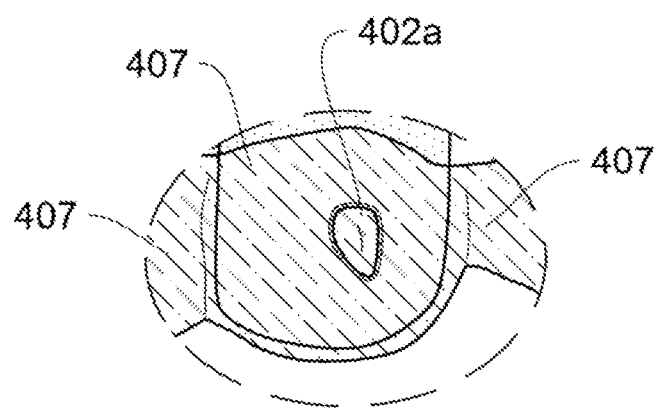

FIG. 4E shows a tooth attachment 402a with a minimum amount of bonded flash 402b around the base of the attachment, after any unbonded flash has been removed. FIG. 4F shows the tooth attachment 402a now in the first tray 407 of a series of alignment trays, and the patient can then go home.

Figure 5:
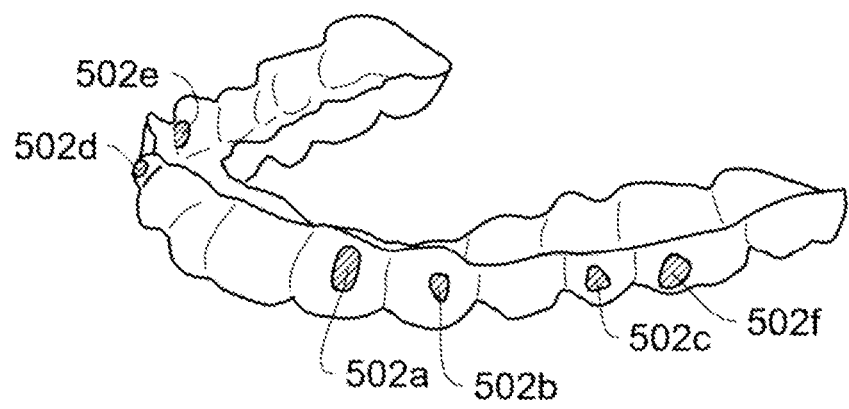
FIG. 5 shows a tray that improves etching and bonding agent confinement.

FIG. 5 shows a preferred preparation tray with various size holes 502a-f which are equal to, or slightly larger area than, the tooth attachment contact area.

Figure 6:
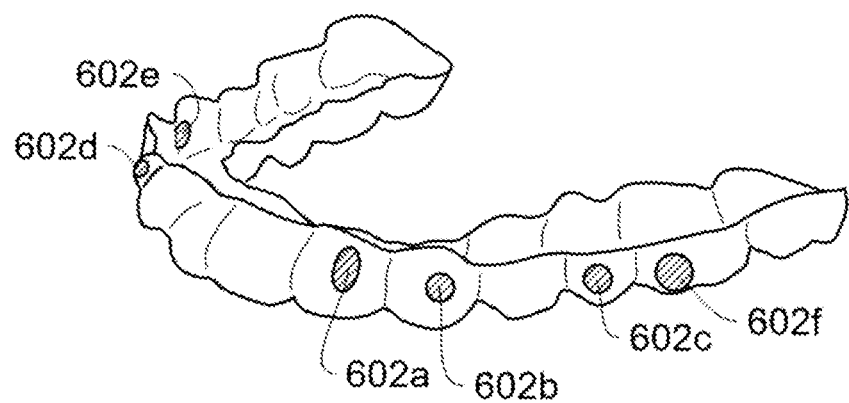
FIG. 6 is similar to FIG. 5 and shows a simplified geometry that provides improved liquid confinement by using holes in the shape of an ellipse or circle.

FIG. 6 shows a simplified hole geometry in another embodiment of the preparation tray. The simplified hole design uses circles 602b,c,d,e,f or an ellipse 602a that provide a liquid confinement geometry that a clinician is able to create in a preparation tray. In this case, the hole geometry is readily created by a clinician using hand punches that allows size variety by selecting a punch size from a variety of punches. Optionally, it can be created by other simple tools. This embodiment provides fluid confinement improvements without requiring the aligner tray factory to create a separate preparation tray. In this case, the factory may provide an additional copy of the attachment creation tray, or the information needed to fabricate a preparation tray.

After utilizing the preferred preparation tray of FIG. 5 or the preparation tray of FIG. 6, the steps of creating the attachments are similar, and far more precise than current art methods. The bonding preparation fluid is applied prior to the application of a bonding agent(s). It is preferred that the bonding preparation fluid has a gel like viscosity, like a hair gel, so the fluid stays within the preparation area ('the hole') in the preparation tray. Preferably it is applied by a syringe having a small pipet for good control over the amount applied. A smaller amount of fluid is needed to cover the preparation area when using the preparation tray. The preparation tray aids in preventing the etching agent from causing excess damage to the tooth enamel by confining it to the preparation area.

The bonding preparation fluid is removed by suction after the etching time is completed, and the tooth is then rinsed off. Typically, this is done while the preparation tray is still in place. This minimizes the amount of tooth surface that is damaged. The dentist then moves to the next tooth.

Often multiple teeth are etched together as a group. The fluid removal and rinsing can be done very quickly. The number of teeth that can be done at a time depends upon the dentist comfort level of timely addressing each tooth.

The method of bonding an attachment to a porcelain crown is similar to the attachment steps just discussed. However, an additional step of sand blasting just prior to the application of the bonding preparation fluid is preferred. This is done by using a dental air abrasion tool which uses a small amount of silicon compound powder. Again, the preparation tray is preferably left in place for this step to confine the area affected by the sand blasting to the preparation area, which is at least the same shape and size of the tooth attachment contact area.

To review the steps of creating a tooth attachment by using the preparation tray of the embodied invention, they are:

Remove plaque from teeth.

Obtaining or creating a preparation tray having holes where the future attachments will be located.

Place the preparation tray on the teeth of a patient. Ensure a correct fit by pressing firmly until tray is well seated.

Apply a bonding preparation fluid, which is at least an etching agent, only in the areas defined by the holes in the preparation tray, ensuring the exposed tooth/restoration surface is thoroughly covered by the bonding preparation fluid.

After the etching time is completed, suction off the bonding preparation fluid. Rinse and dry the teeth.

Remove the preparation tray. Alternatively, it remains in place for the next step.

Apply a bonding agent on top of the etched surface. Scrub with micro brush for 15-30 seconds. Air thin the bonding agent for 15-30 seconds.

Remove the preparation tray if in place.

Place dental compound into the attachment creation tray, ensuring that the attachment chambers are full, or slightly overfilled.

Air dry teeth as needed.

Firmly press the attachment creation tray onto the upper/lower teeth until well seated.

Press around each attachment chamber to ensure that there is no gap between the attachment creation tray and the tooth during curing. This ensures that the attachment is the correct shape and size.

Use a curing light to cure and bond the dental compound of each tooth attachment.

After the attachments for all teeth in the attachment creation tray are cured, remove the attachment creation tray by prying it as needed away from the attachments.

Remove all dental compound flash from the teeth by using a hand scaler.

Floss teeth to ensure there is no flash between the teeth.

Rinse teeth with water.

Patient is ready for alignment correcting tray(s).

The cured dental compound will have some flash, that is, a thin layer of dental compound that has spread out over the tooth surface beyond the preparation area. Because it will not be bonded to the tooth, this flashing can easily be removed with a hand scaler, by prying and scraping it free from the tooth without enamel damage. Typical cleanup time has been observed to average about half a minute to a minute per tooth.

However, if the methods of the embodied invention are not utilized, and there is no preparation tray for confining the bonding preparation fluid(s), the cleanup has been observed to take an average of 4 to 5 minutes per tooth to completely remove the bonded flash. In many cases a hand drill is needed to remove flash that is bonded to the tooth surface. The 80-90% reduction in cleanup time is a significant and important advancement in the art. Also, the patient will be much happier with shorter appointment times and less force required to remove the flash.

Figure 7:
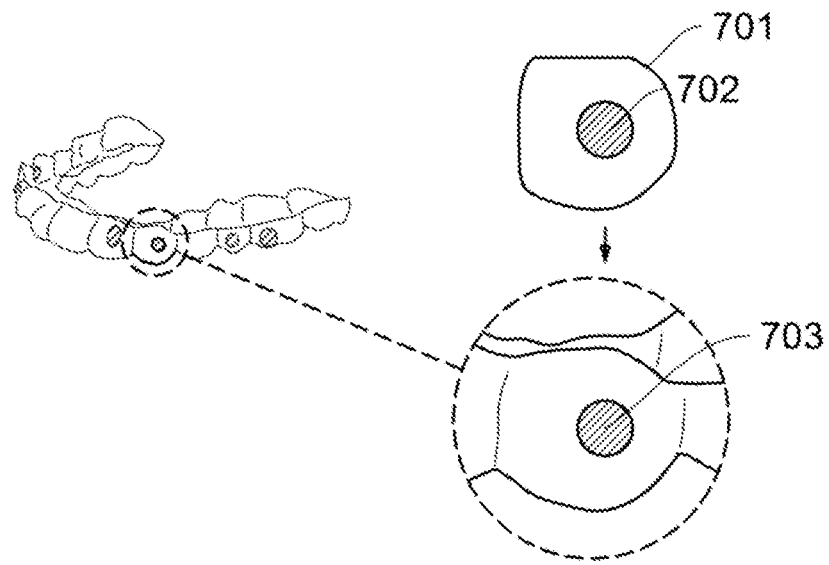
FIG. 7 shows a gasket insert to provide additional liquid confinement for etching and bonding agents.

FIG. 7 shows an embodiment where an insert gasket 701 with an opening in it 702 that matches the hole opening 703 geometry of the preparation tray. The insert gasket opening is then aligned to the hole geometry 703 when the preparation tray is placed on the upper or lower row of teeth. The gasket can be cut out from a variety of materials and is used to provide an improved confinement of bonding preparation fluids. The gasket optionally includes a temporary adhesive that aids in placement and fixing in place.

The preferred method of pressing around the attachment chamber when curing ensures that the projection is cured to the correct size and location and reduces the amount of flashing. Excessive amounts of bonded flash, or an improperly made attachment, is undesirable as it will create an imprecise fit for future tooth alignment trays. There will be unwanted pressure points on the tooth which will cause unintended movement.

A study of a typical tooth using the embodied preparation tray, with good practice as already mentioned, will minimize the amount of bonded flashing around the tooth attachment. The observed amount of bonded flash around the perimeter of the attachment was about ¼ of a millimeter. This amount is similar to the radius of the attachment creation tray at the base of the attachment projections. The conclusion is that there is no significant excess flashing that is bonded to the tooth when using the embodied preparation tray and method of use.

Figure 8:
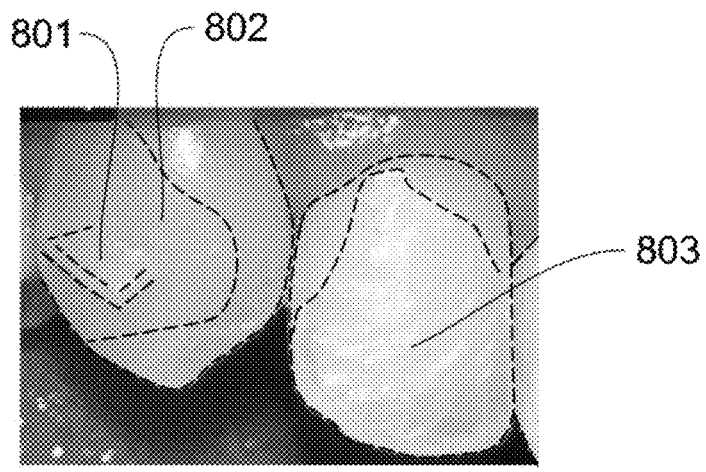
FIG. 8 shows two teeth having typical problems associated with current art methods.

FIG. 8 shows a tooth that has a surface with excessive bonded flash 802 that occurred during current art methods of creating the tooth attachment. The tooth attachment 801 is still in place. The right tooth has had an attachment removed. Unfortunately, the tooth surface 803 has been damaged during the removal of the excessive flash and attachment causing an arrowhead textured surface. This kind of damage is among the worst cases and likely caused by the use of a dentist drill which was required for bonded flash removal. Regardless of how the bonded flash was removed, the result can be traced to the inability to confine the bonding preparation fluid(s) to the attachment contact area.

Figure 9A:
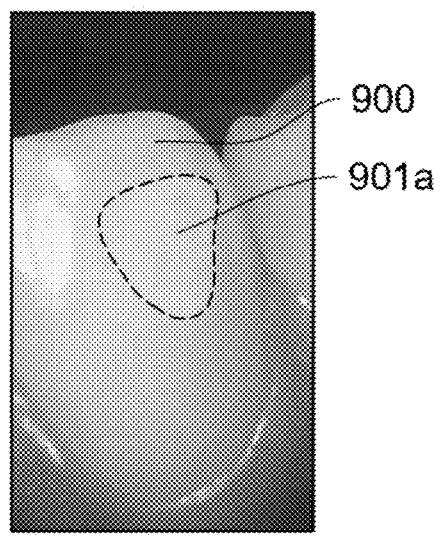
FIGS. 9A-9B show a preferred etched and bonded area of a tooth.
Figure 9B:
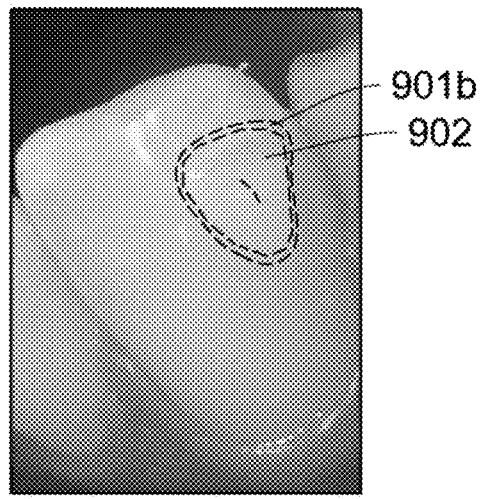

In contrast, FIG. 9A shows an etched preparation area 901a of a tooth 900 when using the embodied invention. In FIG. 9B, a triangular shaped attachment 902 has been attached to the tooth. A peripheral bonded flash area 901b around the triangular shaped attachment 902 is shown. Note that the peripheral bonded flash area 901b is no larger than the preparation area 901a.

A tooth attachment bond is a strong bond and considered to be a permanent bond and requires grinding to remove. This kind of adhesive bond is necessary for the sequential alignment trays to move teeth and prevent disruption to intended tooth movement. The tooth attachments are subject to shear by the removal and attachment of sequential alignment trays. The tooth attachments must survive impact forces from brushing, eating, and stresses from temperature changes in the mouth, such as hot fluids. Tooth attachment flashing, that is nominally attached to the tooth surface outside of the preparation area, is considered to be non-permanent as it is readily removed by a hand scaler. The use of the words 'permanent bonding' is based on this concept as would be readily understood by those in the art.

Figure 10A:
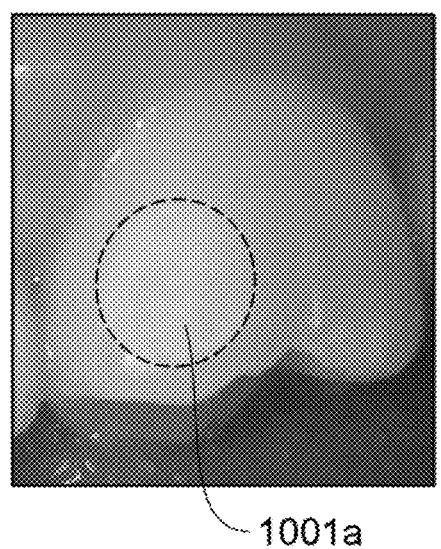
FIGS. 10A-10B shows an improved method of utilizing holes in the shape of a circle or ellipse.
Figure 10B:
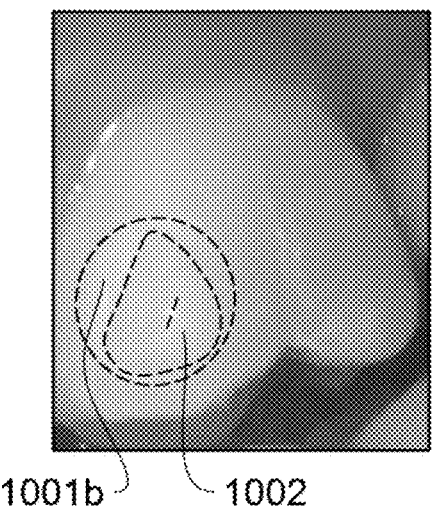

Similarly, FIG. 10A shows an alternate embodied method of creating an etched and bonded area 1001a in the shape of an ellipse which is nearly a circle. FIG. 10B shows the amount of bonded flash in the shape of an ellipse 1001b that surrounds the triangular shaped attachment 1002 area, which is a larger area than is desired. But compared to current art methods, as shown in FIG. 8, there is a significant improvement. Alternately, a circle, square, or triangle hole is used to create the preparation area for the tooth attachment. Creating triangles, circles, squares, and elliptical shapes allow a simple method where a preparation tray is created by a clinician adapting a tray, and then a preparation area is merely punched out from a variety of simple shapes that are amenable to a punch.

While various embodiments of the present invention have been described, the invention may be modified and adapted to various operational methods to those skilled in the art. Therefore, this invention is not limited to the description and figures shown herein, and includes all such embodiments, changes, and modifications that are encompassed by the scope of the claims.

The invention claimed is:

1. A system designed to confine bonding preparation fluid in preparation for a multi-tray orthodontic movement utilizing at least one tooth attachment comprising:
   A) a preparation tray removably attachable to a row of teeth having at least one opening corresponding to a tooth preparation area for preparing a tooth surface,
   B) an attachment creation tray having at least one attachment cavity for forming an attachment member, wherein said attachment cavity has an opening that forms a tooth attachment contact area that is aligned and within said tooth preparation area of said preparation tray,
   C) a series of orthodontic alignment trays having alignment cavities that engage said formed attachment member,
   D) said preparation area is larger than the shape and size of said tooth attachment contact area,
   E) any applied bonding preparation fluid has a suitable viscosity to remain within said at least one opening in said preparation tray,
   F) whereby said at least one opening in said preparation tray so configured substantially confines said applied bonding preparation fluid to said preparation area free of the use of a gasket, G) whereby said preparation tray provides said tooth surface to be free of significant excess flash bonded to said tooth surface.

2. The tooth appliance according to claim 1, whereby any said tooth attachment permanently bonds only within said preparation area.

3. The tooth appliance according to claim 1, whereby said at least one opening in said preparation tray confines said at least one bonding preparation fluid to within ¼ mm of said preparation area.

4. The tooth appliance according to claim 1, wherein said preparation area is in the shape of a circle or an ellipse.

5. A method designed to confine bonding preparation fluid in a system of multi-tray orthodontic movement utilizing at least one tooth attachment comprising:
   A) providing:
   - a) a preparation tray removably attachable to a row of teeth having at least one opening corresponding to a tooth preparation area for preparing a tooth surface,
   - b) an attachment creation tray having at least one attachment cavity for forming an attachment member, wherein said attachment cavity has an opening that forms a tooth attachment contact area that is aligned and within said tooth preparation area of said preparation tray,
   - c) a series of orthodontic alignment trays having alignment cavities that engage said formed attachment member,
   - d) said preparation area is larger than shape and size of said tooth attachment contact area,
   - e) said at least one opening in said separate preparation tray substantially confines any applied bonding preparation fluid to said preparation area,
   B) attaching said separate preparation tray to a row of teeth,
   C) utilizing said at least one opening in said preparation tray to apply at least one said bonding preparation fluid,
   D) said bonding preparation fluid having a viscosity suitable to remain within said at least one opening in said preparation tray,
   E) whereby said preparation tray confines said at least one bonding preparation fluid to said preparation area free of the use of a gasket, and
   F) whereby said preparation tray provides said tooth to be free of significant bonded excess flash bonded to said tooth.

6. The method according to claim 5, whereby any said tooth attachment permanently bonds only within said preparation area.

7. The method according to claim 5, whereby said at least one opening in said preparation tray confines said at least one bonding preparation fluid to within ¼ mm of said preparation area.

8. The method according to claim 5, wherein said preparation area is in the shape of a circle or an ellipse.

* * * * *